United States Patent [11] 3,632,142

[72] Inventor Kiyoshi Ichihara
 11-15, 2-chome, Nakane, Meguro-ku, Tokyo, Japan
[21] Appl. No. 25,012
[22] Filed Apr. 2, 1970
[45] Patented Jan. 4, 1972
[32] Priority Apr. 5, 1969
[33] Japan
[31] 44/30918

[54] PIPE-COUPLING DEVICE
 3 Claims, 13 Drawing Figs.
[52] U.S. Cl. .................................................. 285/88, 285/362
[51] Int. Cl. .................................................. F16l 19/00
[50] Field of Search .................................. 285/362, 377, 38, 320, 87, 88

[56] References Cited
 UNITED STATES PATENTS

| | | | |
|---|---|---|---|
| 808,219 | 12/1905 | Schroeder | 285/362 X |
| 1,080,675 | 12/1913 | Berg | 285/377 X |
| 1,613,644 | 1/1927 | Costello | 285/38 |
| 2,253,628 | 8/1941 | Krapp | 285/362 X |
| 2,286,263 | 6/1942 | Comins | 285/38 X |
| 2,324,792 | 7/1943 | Meyer | 285/38 |
| 3,124,374 | 3/1964 | Krapp | 285/88 X |

FOREIGN PATENTS

| | | | |
|---|---|---|---|
| 1,027,021 | 3/1958 | Germany | 285/38 |
| 448,328 | 11/1912 | Great Britain | 285/362 |

*Primary Examiner*—Thomas F. Callaghan
*Attorney*—Waters, Roditi, Schwartz & Nissen ABSTRACT: A first pipe coupler member secured to one end of a hose pipe is pressed into connected state against a second pipe coupler member with a packing compressed therebetween by a lock collar slidably engaged at one end with the first coupler member and rotated into lock engagement at the other end with the second coupler member in the manner of a bayonet coupling with the aid of a retractable lever handle. The second coupler is connected previously to a port in a vessel or equipment such as a pump or to another pipe. Coupling or uncoupling of the hose pipe can be carried out thus by turning the lock collar through an angle of only about 45°.

PATENTED JAN 4 1972

PIPE-COUPLING DEVICE

BACKGROUND OF THE INVENTION

This invention relates generally to devices for detachably connecting or coupling two or more pipes together or pipes to other structures such as a fluid vessel.

Conventional pipe-coupling devices of this class have, in almost all cases, been of the thread connection type, which requires accuracy in the initial procedure of mating the screw threads and requires considerable time for making a connection. In some cases, moreover, the entire body of a pipe to be coupled must be rotated to make the connection.

SUMMARY OF THE INVENTION

It is an object of the invention to provide a coupling device (hereinafter referred to as a "pipe coupler") of this class which is of simple and durable organization and can be used in various applications to make leakproof pipe connections easily, positively, and rapidly, and which can be easily and rapidly uncoupled when desired.

Another object of the invention is to provide a pipe coupler of the above-stated character which, in coupled state, cannot be unintentionally uncoupled.

Still another object of the invention is to provide a pipe coupler of the above-stated character which does not have parts which can interfere with work such as handling and use of a firehose.

A further object of the invention is to provide a pipe coupler of the above-stated character which can be coupled and uncoupled by one person and by hand without any tools.

According to the present invention, briefly summarized, there is provided a pipe coupler characterized by the combination of a first coupler member joined beforehand at one end to a structure such as a vessel and provided on its outer periphery with at least two spaced-apart ridges formed thereon with helical inclination corresponding to a right-hand screw, a second coupler member having a shank part joined previously to a pipe and an outer flange with a stepped annular recess for retaining a packing, a lock collar of barrel shape slidably engaged at one end with the flange of the second coupler member and rotated into bayonet-type engagement at the other end with the ridges on the first coupler member thereby to press the other end of the first coupler against the packing in a fluidtight manner, and a lever handle pivoted at one end on the lock collar for rotation between an operative position perpendicular to the collar axis for turning the collar and an inoperative retracted position.

The nature, details, and utility of the invention will be more clearly apparent from the following detailed description with respect to specific examples of preferred embodiment of the invention when read in conjunction with the drawings, in which like parts are designated by like reference numerals.

DETAILED DESCRIPTION

Figure 1:
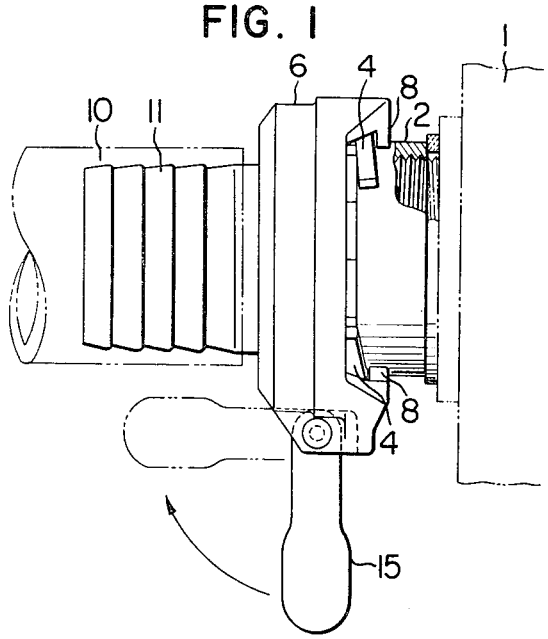
FIG. 1 is a side view, with parts cut away, showing one example of a pipe coupler according to the invention in coupled state.
Figure 2:
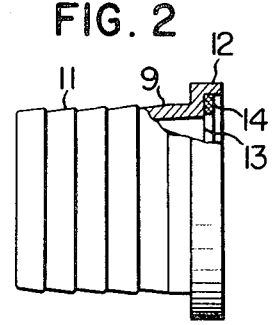
FIG. 2 is a side view, with a part cut away, showing a female coupling pipe member used in the pipe coupler shown in FIG. 1.
Figure 3:
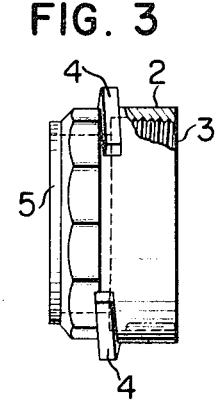
FIG. 3 is a side view, with a part cut away, showing a male coupling pipe member used in the same coupler.

In one example of the invention as illustrated in FIGS. 1 through 6, inclusive, the pipe coupler is used to connect one end of a hose pipe 10 to a connection surface 1 of a structure such as an oil tank or the delivery port of a pump. For this purpose, a nozzle or nipple 1a having external (male) threads is secured to the structure at surface 1, and the internal (female) threads 3 provided on the internal wall surface of a male coupling pipe member 2 at one end thereof (the end axially remote from the middle part of the coupler) are then screwed beforehand onto the external threads of the nipple 1a.

The male coupling pipe member 2 is provided at approximately its middle part and at diametrically opposite sides on its outer periphery with arcuate engagement ridges 4 formed thereon with an inclination in a helical direction corresponding to the threads of a right-hand screw and is provided at its end opposite the aforementioned end with a sealing rim 5 for abutting contact with an annular gasket or packing 14 described hereinafter.

A lock collar 6 of barrel shape for locking together the male coupling pipe member 2 and a female coupling pipe member 9 described hereinafter is provided at one end thereof with a through hole 7 with an engagement rim 16 and at the other end at diametrically opposite sides on the outer periphery thereof with arcuate engagement flanges 8 inwardly projecting for bayonet-type engagement with the engagement ridges 4 on the coupling member 2. The coupling pipe members 2 and 9 and the lock collar 6 are assembled in the following manner.

The female coupling pipe member 9 has a shank part 11 of corrugated or joggled outer surface for fitting thereon hose pipe 10 and an annular flange 12 on one end. Shank part 11 is inserted through hole 7 in lock collar 6 from the end thereof provided with engagement flanges 8 (i.e., from right to left as viewed in FIGS. 1 and 6). Hose pipe 10 is fitted onto shank part 11 of member 9 and, if necessary, held in place with one or more hose clamps (not shown). Packing 14 is placed in a stepped recess 13 formed in the extreme end of flange 12 to face coupling member 2.

Pipe member 9 is then brought toward pipe member 2 until sealing rim 5 at the end of pipe member 2 is in contact with packing 14 placed in recess 13. Then, after lock collar 6 has been angularly positioned so that engagement flanges 8 thereof are aligned in the axial direction with the spaces between ridges 4, lock collar 6 is pressed toward connection surface 1 and turned in the direction of a right-hand screw to cause engagement flanges 8 to engage engagement ridges 4, whereby female coupling pipe member 9 is caused by the helical inclination of ridges 4 to press firmly against packing 14 toward sealing rim 5 of male coupling pipe member 2.

Figure 4:
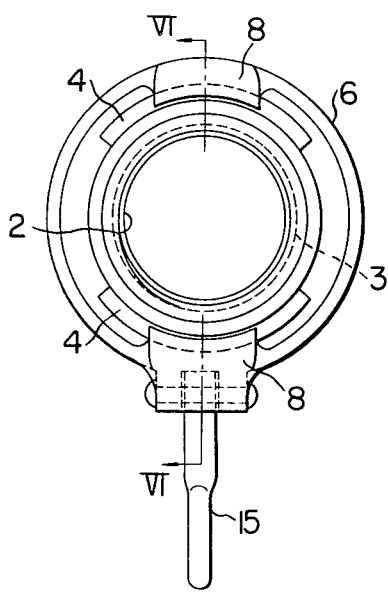
FIG. 4 is an axial view of the pipe coupler shown in FIG. 1 as viewed from the right toward the left therein.
Figure 5:
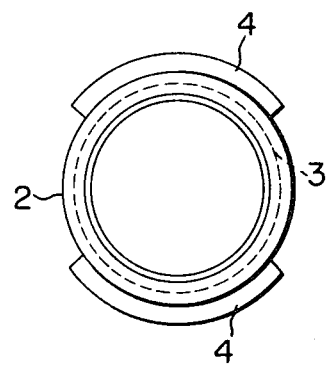
FIG. 5 is an axial view of the male coupling pipe member shown in FIG. 3 as viewed from the right toward the left therein.
Figure 6:
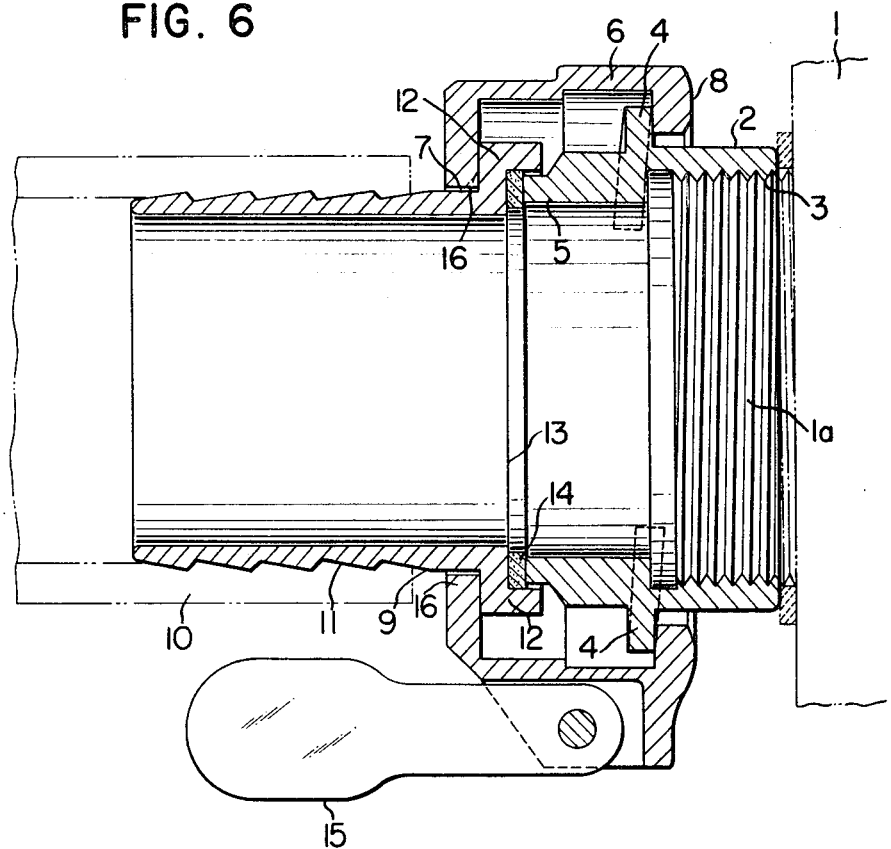
FIG. 6 is an enlarged longitudinal section taken along the plane indicated by line VI—VI in FIG. 4 as viewed in the arrow direction.

To facilitate turning of lock collar 6, a lever hand 15 is pivotally connected thereto and placed in the position indicated by full line in FIGS. 1 and 4 for turning the lock collar 6 and in the position indicated by broken line in FIG. 1 and by full line in FIG. 6 after the coupling has been effected.

Thus, the present invention provides a pipe coupler of an organization and operation whereby a fluidtight joint can be easily and positively made between male and female coupling pipe members 2 and 9 by the simple locking action of engagement flanges 8 engaging cooperatively with engagement ridges 4 as indicated in FIGS. 1 and 6. Therefore, the pipe coupler can be advantageously used in applications such as that in a hose pipe for rapid transfer of oil from a reservoir to transportation means or that in a hose pipe for discharging water.

Accordingly, in comparison with known pipe-coupling devices of the type wherein a female coupling tube is screwed onto a male coupling tube, the coupler according to the invention affords not only speed but also facility in the coupling work and, moreover, eliminates the labor of restoring to normal state a hose pipe which has been twisted because of the screwing action for joining the threaded coupling pipe parts. Furthermore, the pipe coupler is optimally suitable for firehoses which must be coupled quickly to firefighting pumps or fire hydrants for prompt discharge of water to extinguish fires.

Another feature of the pipe coupler of the invention is the ease and rapidity with which it can be encoupled. That is, the female member 9 can be separated from the male member 2 by the simple procedure of raising lever handle 15 to its operational position, turning locking collar 6 by means of lever handle 15 through approximately 45° of angle to the left (counterclockwise as viewed from the hose pipe 10 toward male coupling pipe member 2) to disengage flanges 8 from ridges 4 into positions aligned with the gaps between ridges 4, and pulling lock collar 6 and coupling member 9 connected thereto away from coupling member 2.

Figure 7:
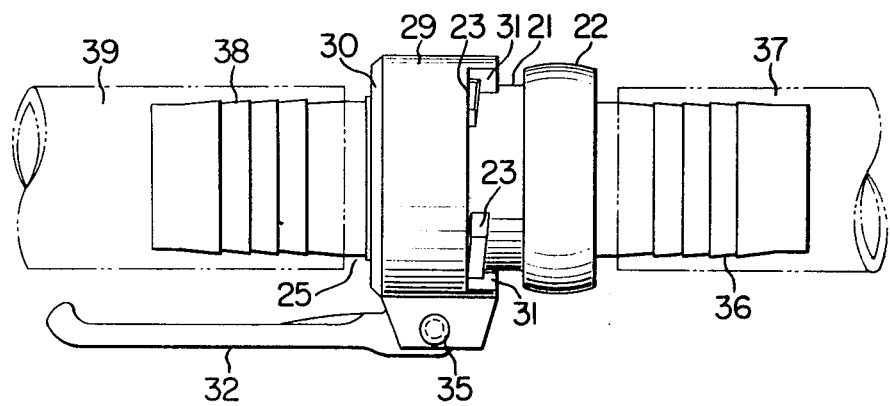
FIG. 7 is a side view showing another example of a pipe coupling according to the invention in coupled state.
Figure 8:
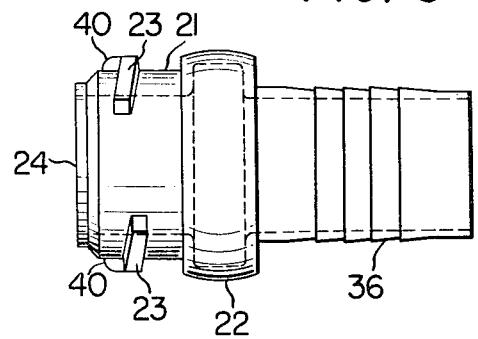
FIG. 8 is a side view showing a male coupling member used in the coupler shown in FIG. 7.
Figure 9:
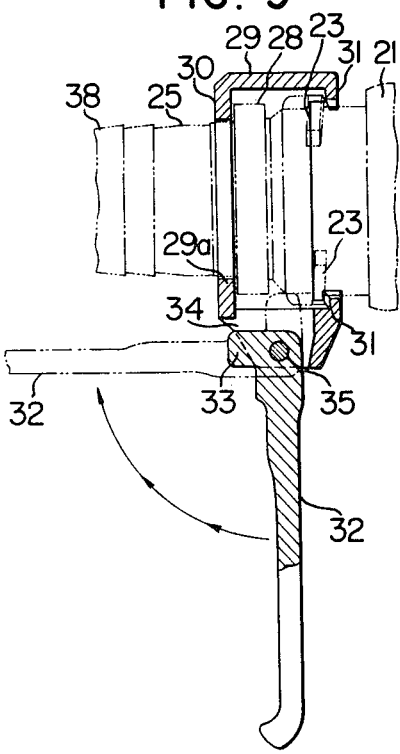
FIG. 9 is a side view, with parts cut away and parts shown in section, of the coupler shown in FIG. 7.

In another example of the invention as illustrated in FIGS. 7, 8, and 9, the pipe coupler is adapted to couple together the ends of two hose pipes 37 and 39 respectively fitted onto and secured to a male coupling pipe member 21 and a female coupling pipe member 25. The member 21 is provided at its middle part with an enlarged-diameter part 22 and around the outer periphery of its end for coupling to member 25 with diametrically opposed engagement ridges 23 inclined in a helical direction corresponding to the threads of a right-hand screw.

The extremity of the member 21 at this end is reduced in outer diameter to a sealing rim 24 for abutting and pressing against a packing 27 fitted into a stepped recess 26 in an expanded end of the female coupling pipe member 25. The outer periphery of this expanded end is in the form of an annular flange 28 for engagement with a lock collar 29 of barrel shape. The lock collar 29 has a through hole 29a at one end thereof through which the member 25 is inserted until the flange 28 contacts and engages with an engagement rim 30 at the same end of the lock collar 29. The other end of the lock collar 29 is provided with diametrically opposed, inwardly projecting engagement flanges 31.

Thus, the above-described parts of this pipe coupler are similar to those of the coupler in the preceding example except that the male coupling pipe member 21 is also provided with a shank part 36 with outer corrugations for fitting the end of the hose pipe 37 thereonto. After the member 25 has been inserted through the hole 29a of the lock collar 29, the hose pipe 39 is fitted onto and secured to the corrugated shank part 38 of the member 25. Then the male and female coupling members 25 and 21 are joined and locked together securely by means of the lock collar 29, the turning of which is facilitated by a lever handle 32, in the same manner as in the preceding example. The lock collar 29 is thus rotated relative to the male coupling member 21 until a part of lock collar 29 abuts against and is stopped by stops 40 formed together with engagement ridges 23.

The lever handle 32 is L shaped in side view, having a pressing lug 33 formed to project at substantially right angles to the main body of the handle at the proximal end thereof, and is pivoted at its proximal end on a transverse pivot pin 35 supported at a through slot 34 formed in the cylindrical wall of the lock collar 29, the lug 33 being directed toward the interior of the lock collar 29. The lever handle 32 can thereby be rotated through approximately 90° of angle from a position perpendicular to the coupler axis, as indicated by full line, to a position substantially parallel to the axis, as indicated by chain line in FIG. 9.

An additional feature of this example is that, when the lever handle 32 is rotated into its inoperative position, i.e., parallel to the coupler axis, the pressing lug 33 is caused to press against the female coupling pipe member 25 thereby to prevent the lock collar 29 from rotating and thereby to maintain the male and female coupling members 21 and 25 in coupled state.

When the coupler of this example is to be uncoupled, lever handle 32 is swung from its locking position to its operative position, i.e., perpendicular to the coupler axis, whereby lug 33 is separated from the outer periphery of coupling member 21. Lock collar 29 can then be rotated in the uncoupling direction (counterclockwise as viewed from lock collar 29 toward coupling member 21) to disengage flanges 31 from ridges 23 and thereby to permit female coupling member 25 to be separated away from male coupling member 21.

Figure 10:
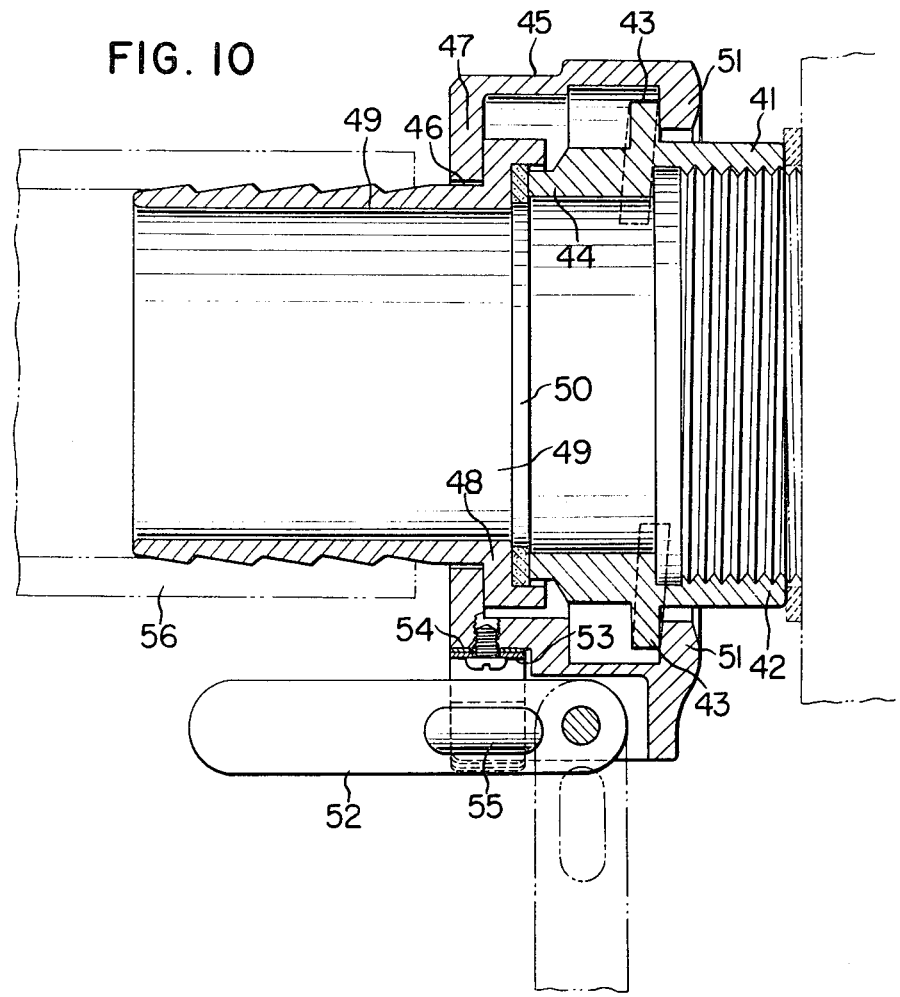
FIG. 10 is a side view, in longitudinal section, showing still another example of embodiment of the invention.
Figure 11:
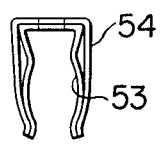
FIG. 11 is a view in the axial direction showing an elastic clamp-holding member used in the coupler shown in FIG. 10.
Figure 12:
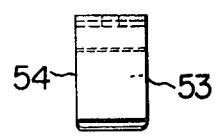
FIG. 12 is a side view of the holding member shown in FIG. 11.

A modification of the first-described example is shown in FIG. 10. A novel feature of this pipe coupler lies in the design of the lever handle 52 for facilitating the turning of the lock collar 45. More specifically, the lever handle 52 is provided with expanded bulbous parts 55 on both lateral sides thereof, and an elastic clamp holder 53 as shown in FIGS. 11 and 12 is fixed to a part of the lock collar 45 in a manner to receive and hold the bulbous parts 55 of the lever handle 52 when this handle is placed in its inoperation position parallel to the coupler axis.

The elastic clamp holder 53 is reinforced and backed by a backing member 54 disposed on the outer side thereof and has a shape whereby the lateral flanges of the holder 53 are first spread apart as the bulbous parts 55 enter into the space therebetween, and then these flanges snugly clamp and hold the lever handle 52 at these bulbous parts with elastically exerted force as the bulbous parts 55 snugly mate with corresponding concavities in the wall of the flanges.

Thus, the lever handle 52 held in this manner is prevented from contacting the base pipe or other objects and from unintentionally rotating into the operative position. At the same time, the lever handle 52 thus held by the clamp holder 53 is prevented from interfering with work such as hose handling for transfer of a liquid. The lever holder 52 can be released from this held state by exerting thereon a force (torque) sufficient to overcome the resistance of the holder 53.

The other parts of the example illustrated in FIG. 10 are similar in organization and operation to corresponding parts of the pipe coupler described hereinabove with reference to FIGS. 1 through 6, and description of these parts, therefore, will not be repeated.

Figure 13:
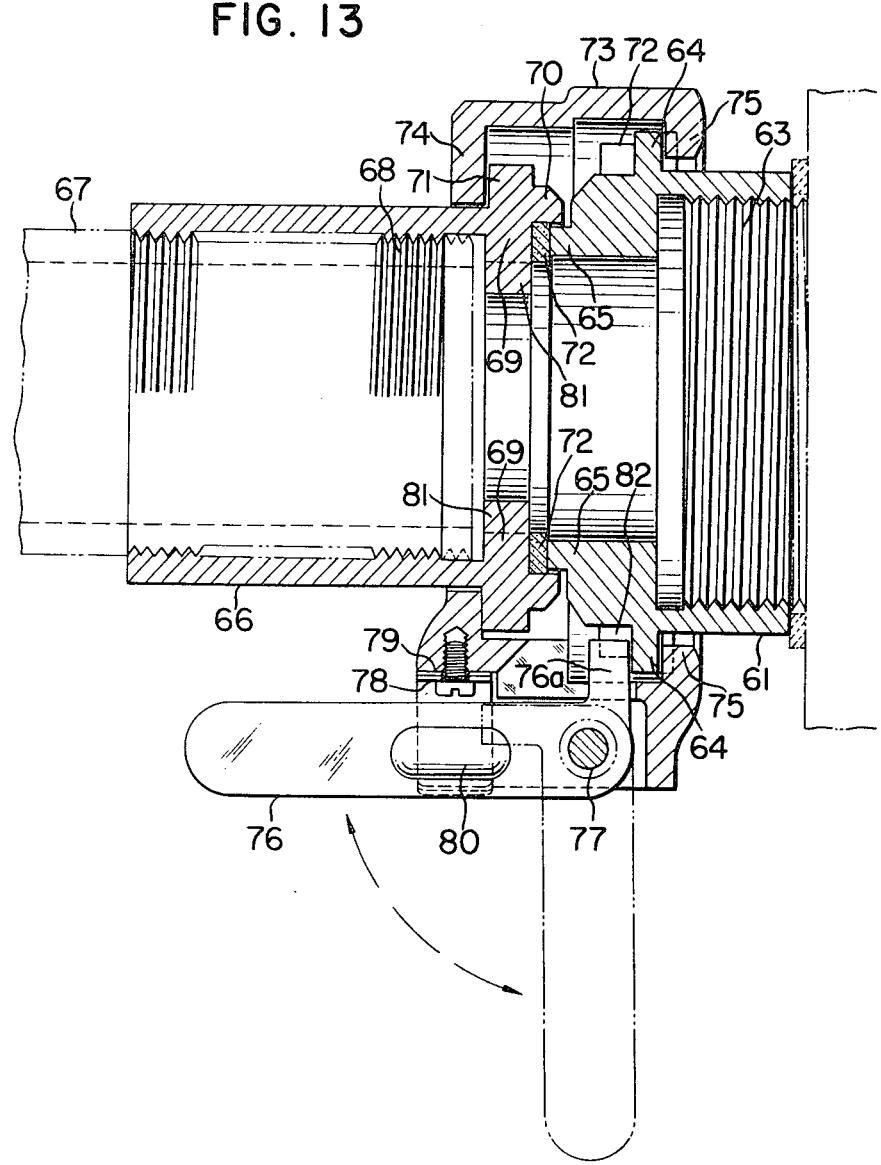
FIG. 13 is a side view, in longitudinal section, showing a further example of a coupler according to the invention.

In a modification, as shown in FIG. 13, of the above-described example of the coupler illustrated in FIGS. 10, 11 and 12, a coupler of the invention is applied to couple a relatively long length of a metal pipe 67 to a structure such as a liquid tank. Such an application is convenient in cases where a metal pipe, e.g., a pipe with an observation window for inspection of the fluid being conducted, is required to be easily and rapidly coupled and uncoupled to the structure.

For this purpose, the female coupling member 66 is provided in its shank part with internal threads 68 for engagement with external threads formed on the end of the pipe 67 to be coupled. The female coupling member 66 is further provided at its end to be joined with the male coupling member 64 with an inwardly directed flange 69 and lugs 81 formed on the flange 69 to facilitate turning of the member 66 when it is being screwed onto or unscrewed off the pipe 67.

Furthermore, the lever handle 76 in this example is similar to the lever handle 52 of the preceding example but additionally has a lug 76a projecting perpendicularly from the pivoted end of the lever handle 76. When the lever handle 76 is placed in its inoperative position parallel to the coupler axis, this lug 76a engages with a stop lug 82 formed on a peripheral part of the male coupling member 64 thereby to control the degree of turning of the lock collar 73 during the coupling operation.

The lever handle 76 is provided with a combination of bulbous parts 80, an elastic clamp holder 78, and backing member 79 similar in construction and operation to that of the preceding example. Accordingly, the lever handle 76 is prevented from slipping accidentally from its inoperative position.

I claim:

1. In a pipe coupler comprising; a first coupling pipe member provided on the outer periphery thereof with at least two spaced-apart engagement ridges formed thereon with helical inclination corresponding to a screw; a second coupling pipe member having a shank part and an outer flange provided with a stopped annular recess; a packing positioned in said recess for receiving and establishing a fluidtight seal with the other end of said first coupling pipe member; a lock collar of barrel shape having at one end thereof with an inwardly directed rim slidably engageable with the outer flange of said second coupling pipe member, and having at the other end thereof engagement flanges for bayonet-type engagement with said engagement ridges to thereby to press the other end of the first coupling pipe member against said packing; and a lever handle pivotably connected at one end to the lock collar and being pivotable between an operative position perpendicular to the collar axis for turning the lock collar and an inoperative retracted position parallel with the collar axis; the improvement wherein said lever handle is formed with an integral lug-shaped arm angularly extending from the pivoted end thereof; and said arm, when the level handle is in said inoperative position, engaging said first coupling pipe member to thereby prevent rotation of said lock collar relative to the first coupling pipe member.

2. The pipe coupler as claimed in claim 1 wherein said arm is formed so as to abut and press against said first coupling pipe member upon engagement with the latter.

3. The pipe coupler as claimed in claim 1 wherein spaced-apart stop lugs are positioned in a circumferential direction extending about the periphery of the first coupling pipe member, and said arm is engageable between said stop lugs upon engagement with said first coupling pipe member.

* * * * *